Patented Nov. 9, 1937

2,098,798

UNITED STATES PATENT OFFICE 2,098,798

METHOD OF GRINDING DYESTUFFS

Irving T. Thornton, Buffalo, N. Y., assignor to National Aniline and Chemical Company, Inc., New York, N. Y., a corporation of New York No Drawing. Application January 11, 1934, Serial No. 706,255

2 Claims. (Cl. 83—94)

This invention relates to the grinding of dyestuffs and is more particularly directed to a process for grinding dyestuffs whereby the injurious action of air and elevated temperatures during the grinding process is substantially avoided and whereby more uniform dye products are obtainable.

In the past it has been the practice to grind dyestuffs in any suitable grinding device, such as a ball mill, the dyestuff being exposed to the atmosphere during the grinding process. Heat generated by the grinding and possibly by oxidation of the dyestuff was dissipated through the walls of the container. Such a process, although satisfactory for the grinding of the more stable dyestuffs, in many cases, especially when grinding readily oxidizable dyestuffs, resulted in appreciable oxidation. With some dyestuffs oxidation or decomposition is so rapid as to cause danger of spontaneous combustion unless great care is exercised during the grinding process.

In accordance with the present invention the material being ground is mixed with a solidified inert gas so that the two materials are intimately mingled during the grinding process. The heat generated by the grinding process is absorbed by the evaporation of the solidified gas. The evaporation of the solidified gas thus causes the formation of a cold gaseous blanket about the particles of material being ground. This cold gaseous blanket protects the dyestuff from exposure to atmospheric air. In addition to protecting the dyestuff from contact with air, the solidified gas maintains its temperature so low that decomposition is inhibited.

The susceptibility of dyestuffs to reaction with constituents of air is largely a matter of surface contact; the present process has to do particularly with dyestuffs in concentrated form, e. g. the commercially pure dyestuff or dye compositions containing it in considerable proportion. The injurious action of the atmosphere may be reduced in accordance with the present invention, by the production of a cold inert gaseous blanket which surrounds the dyestuff during the grinding operation.

In my process I employ a gas which is inert with respect to the dyestuff being treated, and which, in vaporizing during the grinding process, does not pass through a liquid phase but passes directly from the solid phase to the gaseous phase. Since no liquid product is produced upon vaporization of the gas, any tendency to form lumps or pastes is avoided. The quantity of the gas employed depends upon the nature of the grinding process, the heat required to evaporate the particular gas in question, and other factors that will be readily recognized. In general it is desirable that a sufficient quantity of the solidified gas be employed so there is at all times some of it present in solid phase. It need not all be added at the same time however.

The present invention has been found to be especially applicable to certain dyes which upon grinding in ordinary manner tend to decompose and catch fire. Examples of such dyes are Erie Fast Red FD, C. I. 419; Fast Fuchsine G, C. I. 29; Sulphur Bordeaux 2R, Lange No. 351; Fast Wool Blue R, C. I. 208; Fast Wool Blue B, C. I. 209; Niagara Blue G, Conc., C. I. 502.

As illustrative of the manner of carrying out my invention, the following example is given:

*Example.*—One part by weight of Erie Fast Red FD in the form of small lumps is mixed with one-half part to one part by weight of crushed solid carbon dioxide, and the mixture is introduced into a ball mill wherein it is ground to a powder of the desired degree of fineness. During the grinding the dyestuff remains substantially unaffected. Furthermore, it remains in brittle condition so that the grinding process is most efficient. The product is a dyestuff powder of a high degree of purity.

The amount of $CO_2$ added will depend upon the time required for grinding and the temperature of the ball mill as well as other incidental details of procedure. Accordingly the ratio of the dyestuff to carbon dioxide employed will depend upon these factors. It is desirable, however, to employ sufficient so that there is present during substantially the entire grinding process a portion of the $CO_2$ in solid form. The excess, remaining when the grinding process is terminated, will evaporate leaving the dyestuff undiluted.

I claim:

1. The method of pulverizing a chemically sensitive dyestuff, which comprises grinding the dyestuff in admixture with solid carbon dioxide to the desired fineness and maintaining carbon dioxide present in solid phase throughout substantially the entire grinding process, whereby the dyestuff is maintained at a low temperature and is protected from oxidation and decomposition.

2. The method of preventing decomposition of an organic dyestuff selected from the group consisting of Erie Fast Red FD, Fast Fuchsine G, Sulphur Bordeaux 2R, Fast Wool Blue R, Fast Wool Blue B and Niagara Blue G, which comprises grinding the dyestuff in admixture with solid carbon dioxide to the desired fineness and maintaining carbon dioxide present in solid phase throughout substantially the entire grinding process, whereby the dyestuff is maintained at a low temperature and is protected from oxidation and decomposition.

IRVING T. THORNTON.